US010710536B1

(12) United States Patent
Hsu

(10) Patent No.: US 10,710,536 B1
(45) Date of Patent: Jul. 14, 2020

(54) FUNCTION SAFETY SYSTEM FOR VEHICLE MALFUNCTION DISPLAY

(71) Applicant: HIMAX TECHNOLOGIES LIMITED, Tainan (TW)

(72) Inventor: Cheng-Chih Hsu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/362,723

(22) Filed: Mar. 25, 2019

(51) Int. Cl.
*B60R 21/01* (2006.01)

(52) U.S. Cl.
CPC ..... *B60R 21/01* (2013.01); *B60R 2021/01122* (2013.01); *B60R 2300/20* (2013.01)

(58) Field of Classification Search
CPC ......... G09G 2330/022; G09G 2330/04; G09G 2330/12; G09G 2021/01122; B60R 2300/20
See application file for complete search history.

(56) References Cited

U.S. PATENT DOCUMENTS

| | | | | |
|---|---|---|---|---|
| 4,541,066 A * | 9/1985 | Lewandowski | ....... | G06F 11/162 345/618 |
| 5,325,082 A * | 6/1994 | Rodriguez | .......... | B60R 16/0315 340/438 |
| 8,055,412 B2 * | 11/2011 | Passaro | .................. | B60K 35/00 701/49 |
| 8,094,003 B2 * | 1/2012 | Masui | .................... | B60K 35/00 340/461 |
| 8,924,752 B1 * | 12/2014 | Law | ....................... | G06F 1/3206 713/322 |
| 8,976,101 B2 * | 3/2015 | Chang | ................... | G09G 3/3648 345/98 |
| 9,275,429 B2 * | 3/2016 | Alla | ........................ | G06F 9/445 |
| 2006/0048164 A1 | 3/2006 | Fry | | |
| 2006/0256102 A1 * | 11/2006 | Swan | ..................... | G09G 5/008 345/213 |
| 2007/0164969 A1 * | 7/2007 | Kim | ...................... | G09G 3/3611 345/99 |
| 2007/0290886 A1 * | 12/2007 | Stam | ........................ | B60Q 9/00 340/907 |
| 2009/0225090 A1 * | 9/2009 | Chiu | ..................... | G09G 5/363 345/520 |

(Continued)

FOREIGN PATENT DOCUMENTS

CN 1770129 A 5/2006
CN 204008826 U 12/2014

(Continued)

*Primary Examiner* — Hai Phan
*Assistant Examiner* — Son M Tang
(74) *Attorney, Agent, or Firm* — Winston Hsu

(57) ABSTRACT

The present invention provides a function safety system for a vehicle malfunction display is disclosed. The function safety system comprises: an automotive system, a sensor, a display system, a control unit, and a graphics processing unit (GPU). The sensor is coupled to the automotive system, and utilized for detecting whether the automotive system has at least a malfunction. The control unit is coupled to the sensor and directly connected to the display system, and utilized for indicating the display system when the sensor detecting the automotive system has the at least a malfunction. The GPU is coupled to the display system, and utilized for performing information transmission for the display system.

8 Claims, 6 Drawing Sheets

(56) References Cited

U.S. PATENT DOCUMENTS

| | | | | |
|---|---|---|---|---|
| 2011/0234565 A1* | 9/2011 | Morii | G09G 3/3677 | 345/211 |
| 2012/0038685 A1* | 2/2012 | Tanaka | G01C 21/265 | 345/690 |
| 2012/0218412 A1* | 8/2012 | Dellantoni | G01C 21/3679 | 348/148 |
| 2014/0125802 A1 | 5/2014 | Beckert | | |
| 2015/0194137 A1* | 7/2015 | Wyatt | G09G 5/393 | 345/173 |
| 2015/0235338 A1* | 8/2015 | Alla | G06T 1/20 | 345/522 |
| 2017/0372452 A1* | 12/2017 | Wang | G06T 1/20 | |
| 2019/0263487 A1* | 8/2019 | Corl | G01C 21/20 | |
| 2019/0306360 A1* | 10/2019 | Kozuka | H04N 1/00888 | |
| 2020/0027381 A1* | 1/2020 | Hashimoto | G09G 3/006 | |

FOREIGN PATENT DOCUMENTS

| | | |
|---|---|---|
| CN | 105026212 A | 11/2015 |
| WO | 2012/039468 A1 | 3/2012 |
| WO | 2014/152339 A1 | 9/2014 |
| WO | 2017/187936 A1 | 11/2017 |
| WO | 2019/036475 A1 | 2/2019 |

\* cited by examiner

FUNCTION SAFETY SYSTEM FOR VEHICLE MALFUNCTION DISPLAY

BACKGROUND OF THE INVENTION

1. Field of the Invention

The present invention relates to a function safety system, and more particularly, to a function safety system for vehicle malfunction display.

2. Description of the Prior Art

Please refer to FIG. 1. FIG. 1 shows a simplified block diagram of a conventional function safety system 100 for a vehicle malfunction display. The function safety system 100 comprises: an automotive system 102, a sensor 104, a display system 106, a control unit 108, and a graphics processing unit (GPU) 110. The sensor 104 is coupled to the automotive system 102, and utilized for detecting whether the automotive system 102 has a malfunction. The GPU 110 is coupled to between the display system 106 and the control unit 108. When the sensor 104 detects the automotive system 102 has the malfunction, the control unit 108 sends a signal to notify the GPU 110, and then the GPU 110 will integrate the corresponding malfunction image into the driving information and send it to the display system 106. However, when the GPU 110 is damaged or there is a problem with the transmission path between the GPU 110 and the display system 106, if the vehicle has any malfunction, the display system 106 will not display any malfunction image or warning light, and it will cause the driver to continue driving under unknown conditions, which is extremely dangerous.

SUMMARY OF THE INVENTION

It is therefore one of the objectives of the present invention to provide a function safety system for a vehicle malfunction display, so as to solve the above problem.

In accordance with an embodiment of the present invention, a function safety system for a vehicle malfunction display is disclosed. The function safety system comprises: an automotive system, a sensor, a display system, a control unit, and a graphics processing unit (GPU). The sensor is coupled to the automotive system, and utilized for detecting whether the automotive system has at least a malfunction. The control unit is coupled to the sensor and directly connected to the display system, and utilized for indicating the display system when the sensor detecting the automotive system has the at least a malfunction. The GPU is coupled to the display system, and utilized for performing information transmission for the display system.

In accordance with an embodiment of the present invention, a function safety system for a vehicle malfunction display is disclosed. The function safety system comprises: a plurality of automotive systems, a plurality of sensors, a plurality of control unit, a display system, a micro control unit (MCU), and a graphics processing unit (GPU). The sensors are respectively coupled to the automotive systems, and utilized for detecting whether the automotive systems have malfunctions. The control units are respectively coupled to the sensors, and utilized for transmitting indications when the sensors detecting the automotive systems have the malfunctions. The MCU is coupled to the control units and directly connected to the display system, and utilized for receiving the indications and indicating the display system according to the indications. The GPU is coupled to the display system, and utilized for performing information transmission for the display system.

Briefly summarized, the function safety system disclosed by the present invention can correctly display the malfunction images regardless of whether the transmission path between the GPU and the display system is normal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ".

Figure 1:
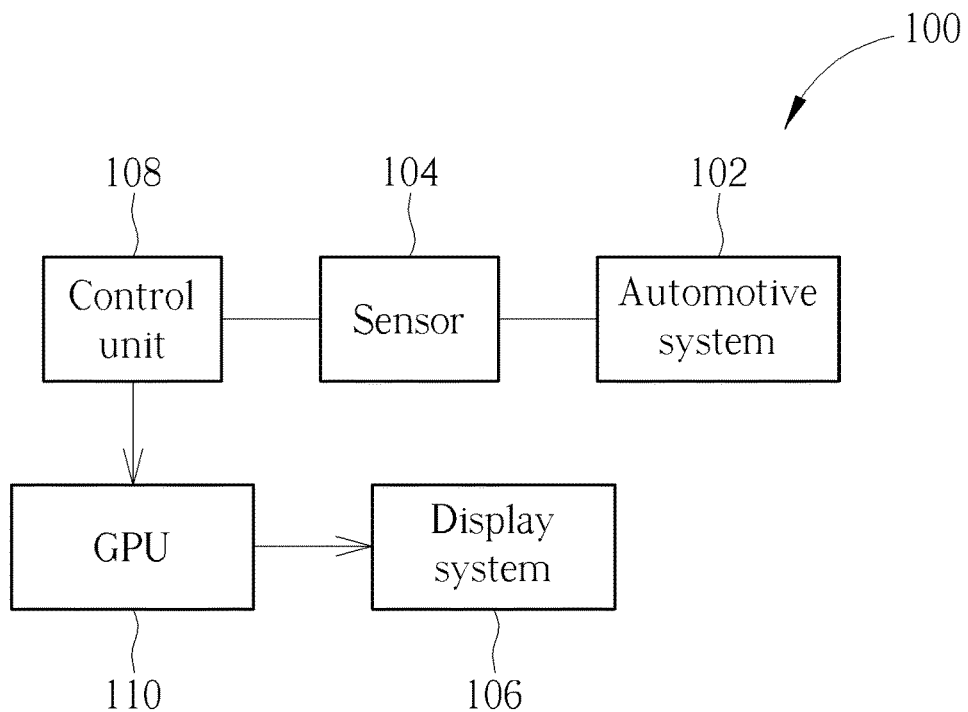
FIG. 1 shows a simplified block diagram of a conventional function safety system for a vehicle malfunction display.
Figure 2:
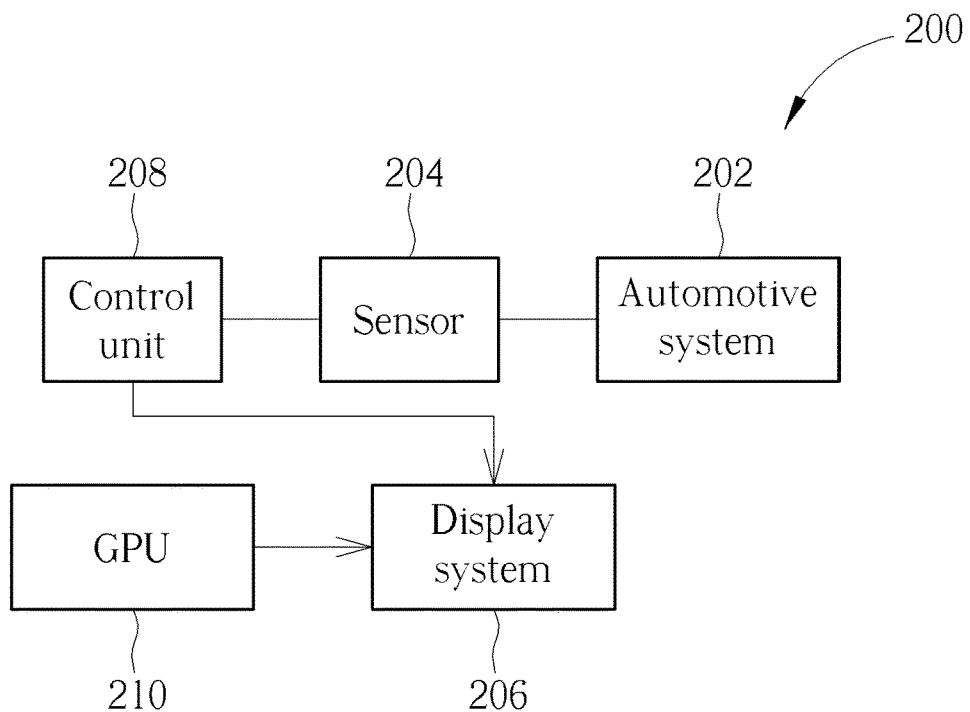
FIG. 2 shows a simplified block diagram of a function safety system for a vehicle malfunction display in accordance with a first embodiment of the present invention.

Please refer to FIG. 2. FIG. 2 shows a simplified block diagram of a function safety system 200 for a vehicle malfunction display in accordance with a first embodiment of the present invention. The function safety system 200 comprises: an automotive system 202, a sensor 204, a display system 206, a control unit 208, and a graphics processing unit (GPU) 210. The automotive system 202 can be an engine management system, an ignition system, a radio system, a telematics system, or an in-car entertainment system, etc. The sensor 204 is coupled to the automotive system 202, and utilized for detecting whether the automotive system 202 has at least a malfunction. The display system 206 can be an LCD module. The control unit 208 is coupled to the sensor 204 and directly connected to the display system 206, and utilized for indicating the display system 206 when the sensor 204 detects the automotive system 202 has the at least a malfunction. The GPU 210 is coupled to the display system 206, and utilized for performing information transmission for the display system 206.

Figure 3:
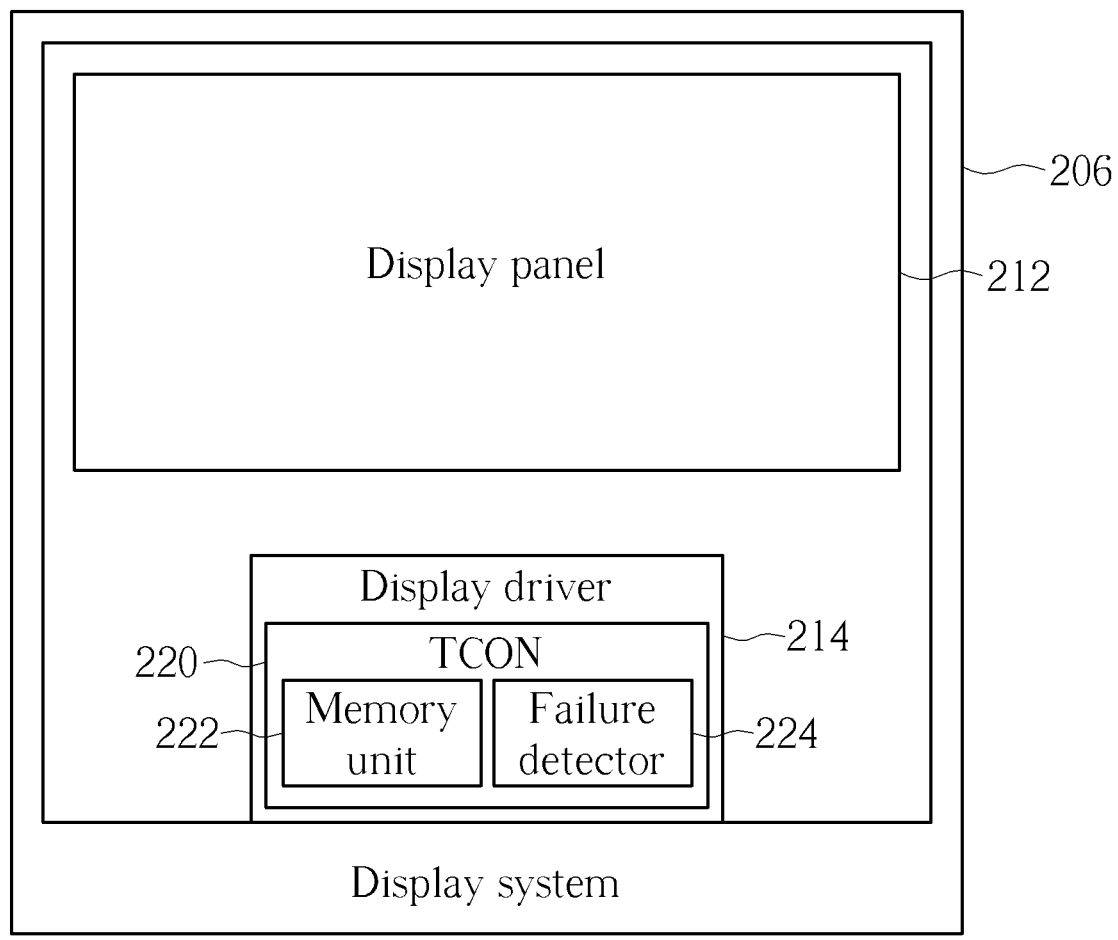
FIG. 3 shows a simplified block diagram of the display system in accordance with an embodiment of the present invention.
Figure 4:
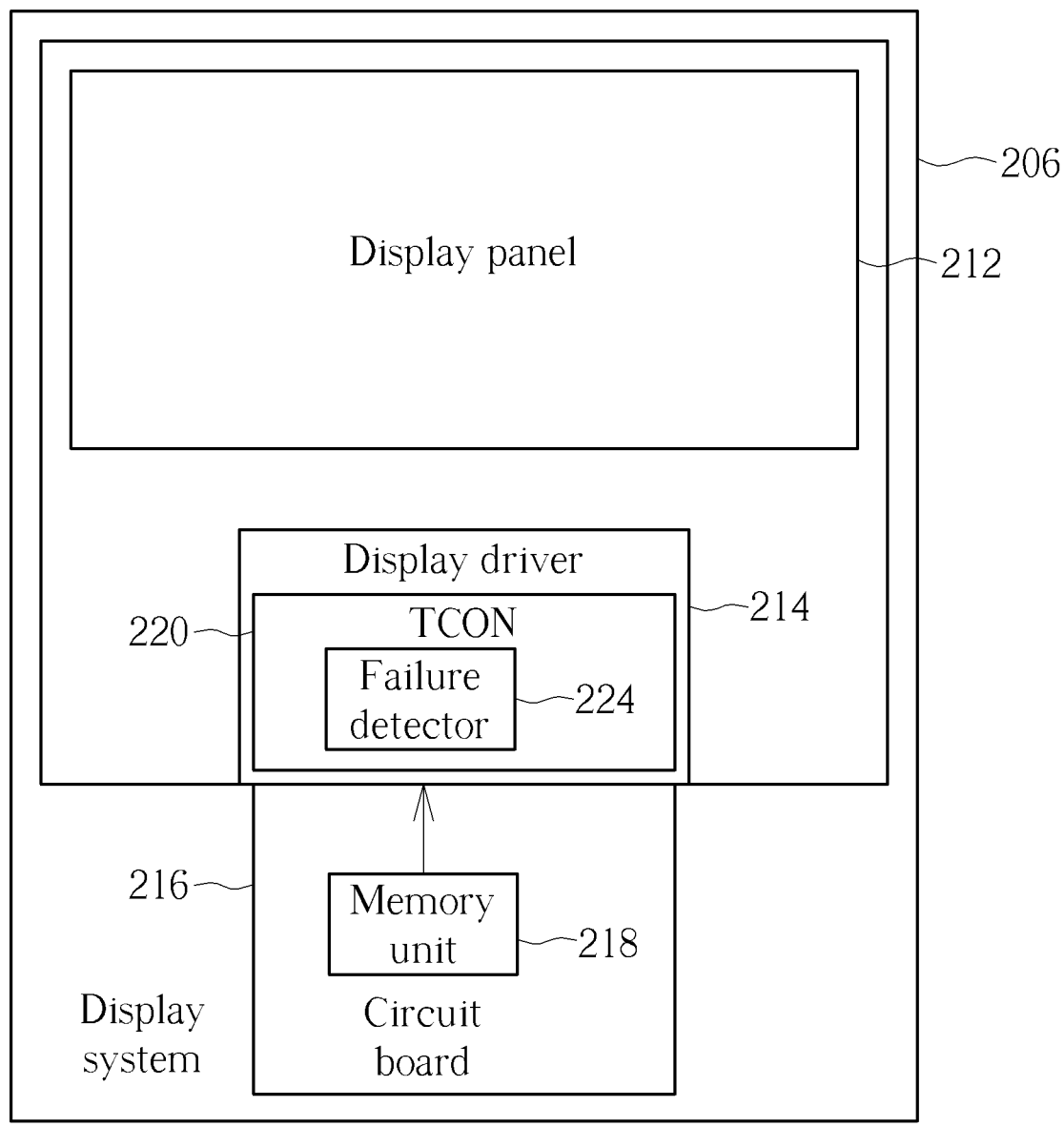
FIG. 4 shows a simplified block diagram of the display system in accordance with another embodiment of the present invention.

Please refer to FIG. 3. FIG. 3 shows a simplified block diagram of the display system 206 in accordance with an embodiment of the present invention. The display system 206 comprises: a display panel 212, a display driver 214, and a timing controller (TCON) 220. The TCON 220 comprises a memory unit 222 and a failure detector 224. The memory unit 222 is utilized for storing malfunction images corresponding to the malfunctions of the vehicle, wherein the memory unit 222 can be a lookup table, or made by a logic circuit to reduce cost. The failure detector 224 is utilized for detecting whether the information transmission is abnormal between the GPU 210 and the TCON 220, wherein when the information transmission is abnormal between the GPU 210 and the TCON 220, the display system 206 can display at least a malfunction image directly according to the indication of the control unit 208. In this way, the present invention can correctly display the malfunction images regardless of whether the transmission path between the GPU 210 and the display system 206 is normal. Please note that the above embodiment is merely for an illustrative purpose and is not meant to be a limitation of the present invention. For example, please refer to FIG. 4. FIG. 4 shows a simplified block diagram of the display system 206 in accordance with another embodiment of the present invention. The display system 206 comprises: a display panel 212, a display driver 214, a circuit board 216, a memory unit 218, and a timing controller (TCON) 220. The memory unit 218 is positioned on the circuit board 216 (such as FPC or PCB), and utilized for storing malfunction images corresponding to the malfunctions of the vehicle, wherein the memory unit 218 can be a non-volatile memory (such as NAND flash memory). The TCON 220 comprises a failure detector 224. The failure detector 224 is utilized for detecting whether the information transmission is abnormal between the GPU 210 and the TCON 220, wherein when the information transmission is abnormal between the GPU 210 and the TCON 220, the display system 206 can display at least a malfunction image directly according to the indication of the control unit 208.

Figure 5:
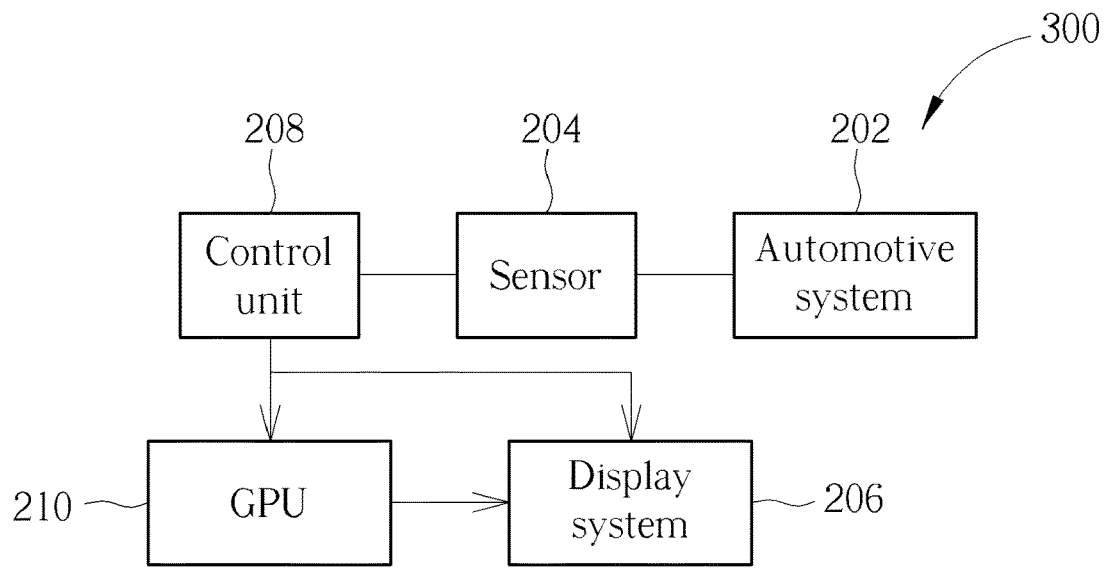
FIG. 5 shows a simplified block diagram of a function safety system for a vehicle malfunction display in accordance with a second embodiment of the present invention.

Please refer to FIG. 5. FIG. 5 shows a simplified block diagram of a function safety system 300 for a vehicle malfunction display in accordance with a second embodiment of the present invention. The function safety system 300 comprises: an automotive system 202, a sensor 204, a display system 206, a control unit 208, and a GPU 210. The automotive system 202 can be an engine management system, an ignition system, a radio system, a telematics system, or an in-car entertainment system, etc. The sensor 204 is coupled to the automotive system 202, and utilized for detecting whether the automotive system 202 has at least a malfunction. The display system 206 can be an LCD module, for example, as shown in FIG. 3 or FIG. 4. The control unit 208 is coupled to the sensor 204 and directly connected to the display system 206, and utilized for indicating the display system 206 when the sensor 204 detects the automotive system 202 has the at least a malfunction. The GPU 210 is coupled to the display system 206 and the control unit 208, and utilized for performing information transmission for the display system 206, and if the transmission path between the GPU 210 and the display system 206 is normal, the control unit 208 can indicate the display system 206 via the GPU 210 when the sensor 204 detects the automotive system 202 has the at least a malfunction. Please note that the above embodiment is merely for an illustrative purpose and is not meant to be a limitation of the present invention.

Figure 6:
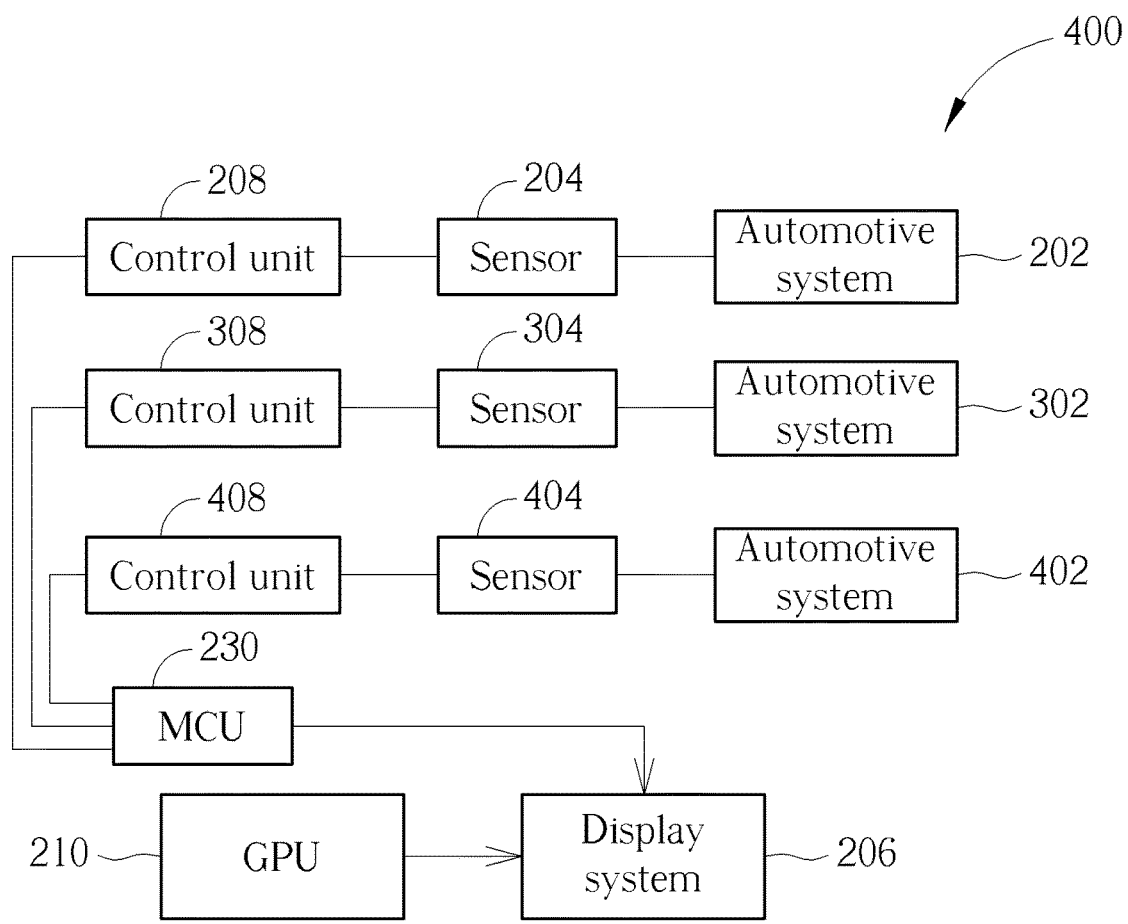
FIG. 6 shows a simplified block diagram of a function safety system for a vehicle malfunction display in accordance with a third embodiment of the present invention.

Please refer to FIG. 6. FIG. 6 shows a simplified block diagram of a function safety system 400 for a vehicle malfunction display in accordance with a third embodiment of the present invention. The function safety system 400 comprises: three automotive systems 202, 302, 402, three sensors 204, 304, 404, a display system 206, three control units 208, 308, 408, a GPU 210, and a micro control unit (MCU) 230. The automotive systems 202, 302, 402 can be different car systems such as engine management systems, ignition systems, radio systems, telematics systems, or in-car entertainment systems, etc. The sensor 204, 304, 404 are respectively coupled to the automotive systems 202, 302, 402, and utilized for detecting whether the automotive system 202, 302, 402 have malfunctions. The display system 206 can be an LCD module, for example, as shown in FIG. 3 or FIG. 4. The control units 208, 308, 408 are respectively coupled to the sensors 204, 304, 404, and utilized for transmitting indications when any one of the sensors 204, 304, 404 detects any one of the automotive systems 202, 302, 402 has the malfunctions. The MCU 230 is coupled to the control units 208, 308, 408 and directly connected to the display system 206, and utilized for receiving the indications and indicating the display system 206 according to the indications. The GPU 210 is coupled to the display system 206, and utilized for performing information transmission for the display system 206. Please note that the above embodiment is merely for an illustrative purpose and is not meant to be a limitation of the present invention. For example, the number of the automotive systems, sensors, and the control units can be changed according to different design requirements.

Figure 7:
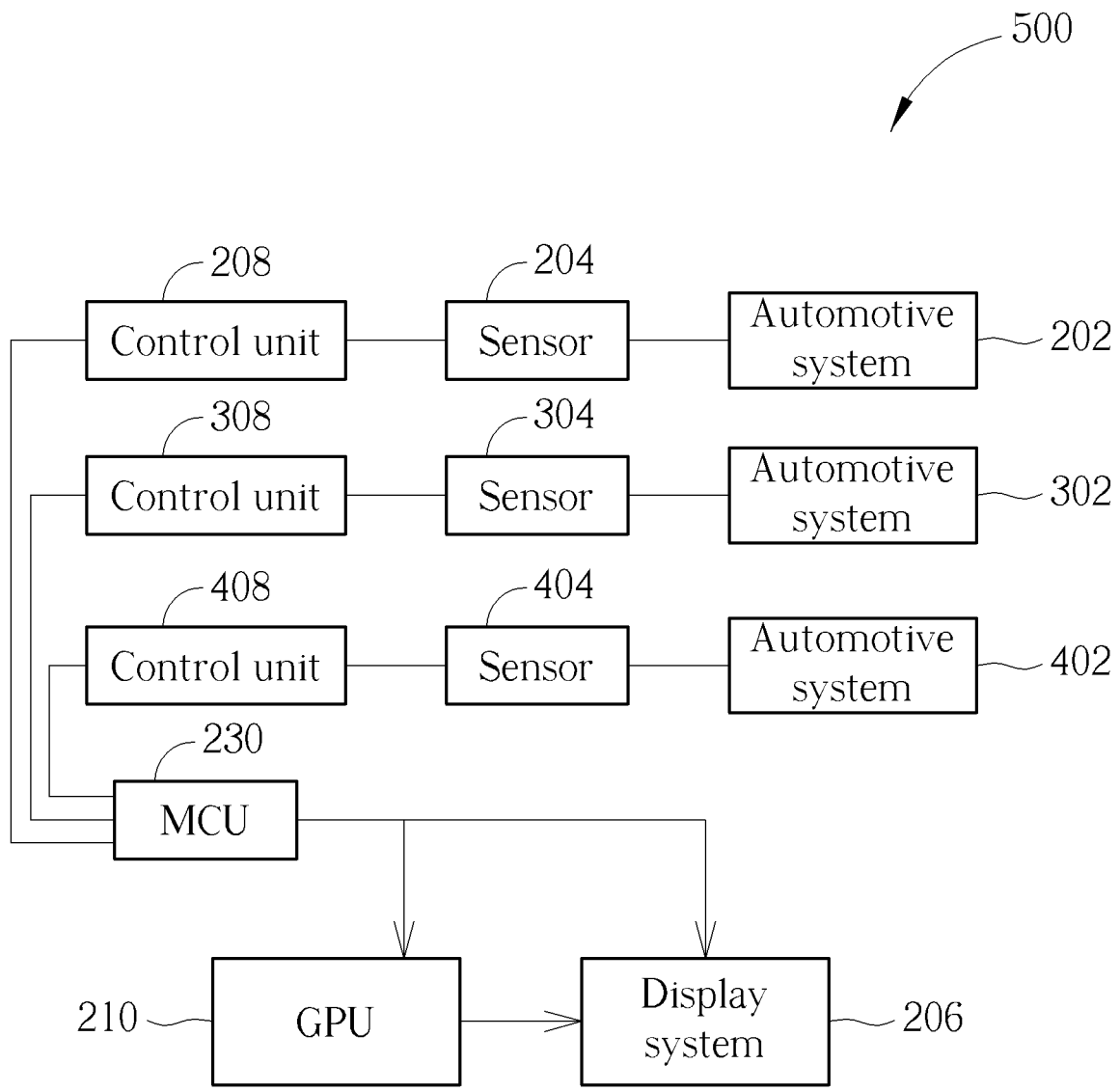
FIG. 7 shows a simplified block diagram of a function safety system for a vehicle malfunction display in accordance with a fourth embodiment of the present invention.

Please refer to FIG. 7. FIG. 7 shows a simplified block diagram of a function safety system 500 for a vehicle malfunction display in accordance with a fourth embodiment of the present invention. The function safety system 500 comprises: three automotive systems 202, 302, 402, three sensors 204, 304, 404, a display system 206, three control units 208, 308, 408, a GPU 210, and an MCU 230. The automotive systems 202, 302, 402 can be different car systems such as engine management systems, ignition systems, radio systems, telematics systems, or in-car entertainment systems, etc. The sensor 204, 304, 404 are respectively coupled to the automotive systems 202, 302, 402, and utilized for detecting whether the automotive system 202, 302, 402 have malfunctions. The display system 206 can be an LCD module, for example, as shown in FIG. 3 or FIG. 4. The control units 208, 308, 408 are respectively coupled to the sensors 204, 304, 404, and utilized for transmitting indications when any one of the sensors 204, 304, 404 detects any one of the automotive systems 202, 302, 402 has the malfunctions. The MCU 230 is coupled to the control units 208, 308, 408 and directly connected to the display system 206, and utilized for receiving the indications and indicating the display system 206 according to the indications. The GPU 210 is coupled to the display system 206 and the MCU 230, and if the transmission path between the GPU 210 and the display system 206 is normal, the MCU 230 can indicate the display system 206 via the GPU 210 when any one of the sensors 204, 304, 404 detects anyone of the automotive systems 202, 302, 402 has the malfunctions. Please note that the above embodiment is merely for an illustrative purpose and is not meant to be a limitation of the present invention. For example, the number of the automotive systems, sensors, and the control units can be changed according to different design requirements.

Figure 8A:
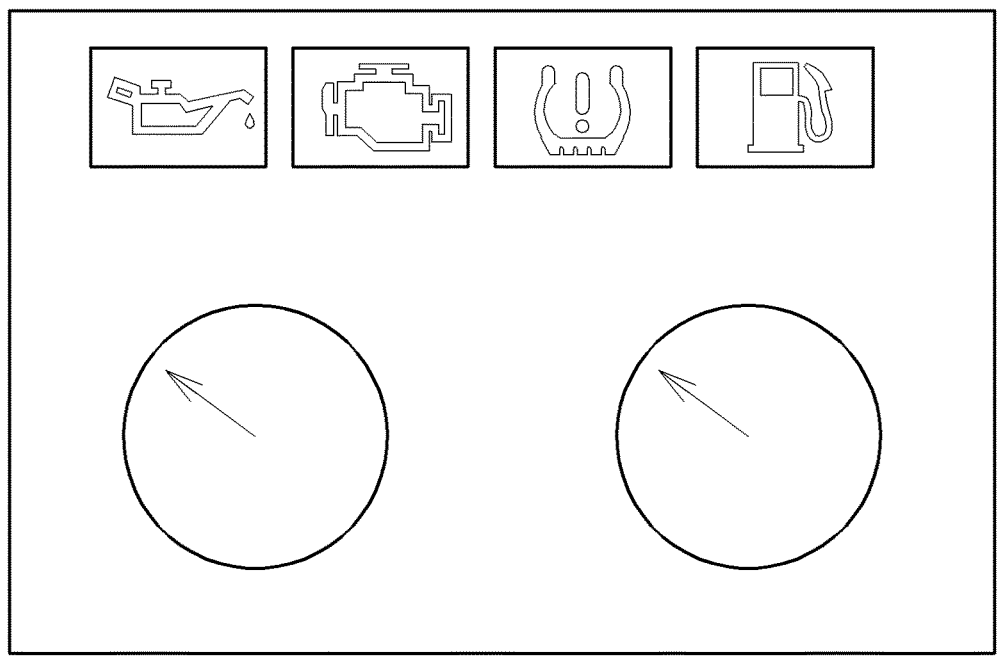
FIG. 8a shows a simplified diagram of a display screen of the display system when the transmission path between the GPU and the display system of the present invention is normal.
Figure 8B:
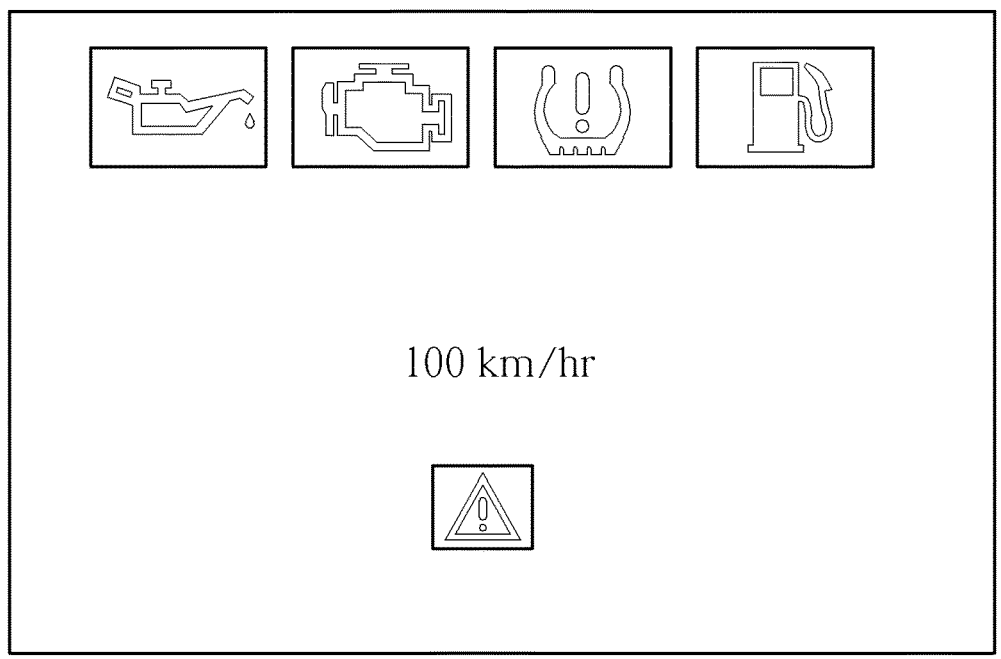
FIG. 8b shows a simplified diagram of a display screen of the display system when the transmission path between the GPU and the display system of the present invention is abnormal.

Please refer to FIG. 8a and FIG. 8b. FIG. 8a shows a simplified diagram of a display screen of the display system 206 when the transmission path between the GPU 210 and the display system 206 is normal, and FIG. 8b shows a simplified diagram of a display screen of the display system 206 when the transmission path between the GPU 210 and the display system 206 is abnormal. As shown in FIG. 8b, if the transmission path between the GPU 210 and the display system 206 is abnormal, the MCU 230 can bypass the GPU 210 and indicate the display system 206 via a serial interface (such as SPI or I2C) to show the malfunction images corresponding to the malfunctions of the vehicle, and simplified driving information (such as speed). In addition, the MCU 230 can indicate the display system 206 to show a special warning light (such as the triangle frame exclamation mark in FIG. 8b), to inform the driver that the transmission path between the GPU 210 and the display system 206 is abnormal.

Briefly summarized, the function safety system disclosed by the present invention can correctly display the malfunction images regardless of whether the transmission path between the GPU and the display system is normal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A function safety system for a vehicle malfunction display, comprising:
    an automotive system;
    a sensor, coupled to the automotive system, for detecting whether the automotive system has at least a malfunction;
    a display system;
    a control unit, coupled to the sensor and directly connected to the display system, for indicating the display system when the sensor detecting the automotive system has the at least a malfunction; and
    a graphics processing unit (GPU), coupled to the display system, for performing information transmission for the display system;
    wherein the display system comprises:
        a display panel;
        a display driver; and
        a timing controller, comprising:
            a failure detector, for detecting whether the information transmission is abnormal between the GPU and the timing controller; and
            wherein when the information transmission is abnormal between the GPU and the timing controller, the display system displays at least a malfunction image directly according to the indication of the control unit.

2. The function safety system of claim 1, wherein the timing controller further comprises:
    a memory unit, for storing malfunction images corresponding to the malfunctions of the vehicle.

3. The function safety system of claim 1, wherein the display system further comprises:
    a memory unit, coupled to the timing controller, for storing malfunction images corresponding to the malfunctions of the vehicle.

4. The function safety system of claim 1, wherein the GPU is further coupled to the control unit.

5. A function safety system for a vehicle malfunction display, comprising:
    a plurality of automotive systems;
    a plurality of sensors, respectively coupled to the automotive systems, for detecting whether the automotive systems have malfunctions;
    a plurality of control units, respectively coupled to the sensors, for transmitting indications when the sensors detecting the automotive systems have the malfunctions;
    a display system;
    a micro control unit (MCU), coupled to the control units and directly connected to the display system, for receiving the indications and indicating the display system according to the indications; and
    a graphics processing unit (GPU), coupled to the display system, for performing information transmission for the display system;
    wherein the display system comprises:
        a display panel;
        a display driver; and
        a timing controller, comprising:
            a failure detector, for detecting whether the information transmission is abnormal between the GPU and the timing controller;
            wherein when the information transmission is abnormal between the GPU and the timing controller, the display system displays malfunction images directly according to the indication of the MCU.

6. The function safety system of claim 5, wherein the timing controller further comprises:
    a memory unit, for storing malfunction images corresponding to the malfunctions of the vehicle.

7. The function safety system of claim 5, wherein the display system further comprises:
    a memory unit, coupled to the timing controller, for storing malfunction images corresponding to the malfunctions of the vehicle.

8. The function safety system of claim 5, wherein the GPU is further coupled to the MCU.

* * * * *